US010686355B2

(12) United States Patent
Malyarov et al.

(10) Patent No.: US 10,686,355 B2
(45) Date of Patent: Jun. 16, 2020

(54) TRANSPORT SYSTEM PUCK ASSEMBLY

(71) Applicant: MagneMotion Inc., Devens, MA (US)

(72) Inventors: Ilya Malyarov, Livingston, NJ (US); Baris Yagci, Whippany, NJ (US)

(73) Assignee: MagneMotion, Inc., Devens, MA (US)

( * ) Notice: Subject to any disclaimer, the term of this patent is extended or adjusted under 35 U.S.C. 154(b) by 390 days.

(21) Appl. No.: 15/631,490

(22) Filed: Jun. 23, 2017

(65) Prior Publication Data

US 2018/0019653 A1    Jan. 18, 2018

Related U.S. Application Data

(60) Provisional application No. 62/362,865, filed on Jul. 15, 2016.

(51) Int. Cl.
| | | |
|---|---|---|
| *H02K 41/03* | (2006.01) | |
| *B60L 13/10* | (2006.01) | |
| *B60L 13/03* | (2006.01) | |
| *H02K 41/02* | (2006.01) | |

(52) U.S. Cl.
CPC ............ *H02K 41/031* (2013.01); *B60L 13/03* (2013.01); *B60L 13/10* (2013.01); *H02K 41/02* (2013.01)

(58) Field of Classification Search
CPC ...... H02K 41/031; H02K 41/02; B60L 13/03; B60L 13/10
See application file for complete search history.

(56) References Cited

U.S. PATENT DOCUMENTS

| | | | |
|---|---|---|---|
| 5,952,742 A | 9/1999 | Stoiber et al. | |
| 7,378,765 B2* | 5/2008 | Iwasa ..................... | H02K 33/00 |
| | | | 310/14 |
| 8,643,228 B2* | 2/2014 | Vogel ................. | G02B 23/2476 |
| | | | 310/12.24 |
| 2006/0226713 A1* | 10/2006 | Lehr ....................... | F16C 29/02 |
| | | | 310/12.04 |
| 2016/0190968 A1 | 6/2016 | Piaton et al. | |

FOREIGN PATENT DOCUMENTS

| | | |
|---|---|---|
| CN | 1427534 A | 7/2003 |
| CN | 1799180 A | 7/2006 |
| CN | 101378931 A | 3/2009 |
| CN | 204205909 U | 3/2015 |
| CN | 104528298 A | 4/2015 |

(Continued)

OTHER PUBLICATIONS

Office Action for Chinese Application No. 201710561032.2 dated Feb. 3, 2019, with English translation; 13 pages.

(Continued)

*Primary Examiner* — Mohamad A Musleh
(74) *Attorney, Agent, or Firm* — Fletcher Yoder, P.C.

(57) ABSTRACT

A mover for a linear motor system includes a magnet subassembly. The mover includes a magnetic structure disposed on at least one side of the magnet subassembly and creating with the magnetic subassembly a resultant magnetic field. The magnetic structure being centered on a detected center of the resultant magnetic field. The mover includes a body structure mounted on or with reference to the magnetic structure to position a physical center of the body structure at approximately the detected center of the resultant magnetic field.

5 Claims, 8 Drawing Sheets

(56) References Cited

FOREIGN PATENT DOCUMENTS

| | | |
|---|---|---|
| DE | 29520879 U1 | 4/1996 |
| WO | 2014047104 A1 | 3/2014 |
| WO | 2014170414 A2 | 10/2014 |

OTHER PUBLICATIONS

Extended European Search Report for Application No. 17181637.4 dated Jun. 5, 2018 (10 pages).
Notification of Third Office Action for Chinese Application No. 201710561032.2 dated Mar. 18, 2020, with English translation, 6 pages.

* cited by examiner

TRANSPORT SYSTEM PUCK ASSEMBLY

CROSS-REFERENCE TO RELATED APPLICATIONS

This application claims priority from and the benefit of U.S. Provisional Application Ser. No. 62/362,865, entitled "Transport System Puck Assembly," filed Jul. 15, 2016, which is hereby incorporated by reference in its entirety.

BACKGROUND

The present disclosure relates generally to transport systems, and more particularly, to an assembly for a mover of the transport system.

There are many types of transport systems that include movers that move, via rotary motors, linear motors, pneumatics, or the like, along a path of the transport system. For example, linear motors may refer to motors that produce a magnetic field to provide a force to move a mover along a distance of the motor. Linear motors may be used in various applications in which an object is moved, via the mover, from a first location to a second location along the path. For example, the linear motor may include stator windings along the path. Current that flows through the stator windings may drive the mover via one or more magnets within the mover.

The mover may include various parts and sub-assemblies to move the mover along the path. However, each of the parts and sub-assemblies of the mover may include tolerances that cause the mover to be calibrated in an inconsistent manner. Further, the mover may move to inconsistent locations due to the inconsistencies in the parts and sub-assemblies.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a mover for a linear motor system includes a magnet subassembly, a magnetic structure disposed on at least one side of the magnet subassembly and creating with the magnet subassembly a resultant magnetic field, the magnetic structure being centered on a detected center of the resultant magnetic field, and a body structure mounted on or with reference to the magnetic structure to position a physical center of the body structure at approximately the detected center of the resultant magnetic field.

In a second embodiment, a method for making a mover for a linear magnet system, the method includes assembling a magnet subassembly, disposing a magnetic structure on at least one side of the magnet subassembly to create a resultant magnetic field with the magnet subassembly, and centering the magnetic structure on a detected center of a magnetic field of the magnet subassembly or the resultant magnetic field.

In a third embodiment, a method for making a mover for a linear magnet system includes assembling a magnet subassembly, disposing a magnetic structure on at least one side of the magnet subassembly to create a resultant magnetic field with the magnet subassembly, aligning a reference feature of the magnetic structure at a desired location with respect to a detected center of a magnetic field of the magnet subassembly or the resultant magnetic field, and securing the magnetic structure to the magnet subassembly.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present disclosure relate to movers, referred to as pucks, of a linear motor system. The movers may include various parts and sub-assemblies that move the mover to a location due to the interaction between ferromagnetic materials of the mover and the magnetic field of the linear motor system. For example, a magnetic subassembly of magnets may be coupled to one another to form a halbach array of magnets in which a magnetic field is reduced in one direction and increased in another direction. Each of the assemblies may be inconsistent from one another due to different mechanical and magnetic tolerances of the parts and subassemblies. For example, different sized parts may be used that vary from mover to mover. Because of the inconsistent assemblies, various movers may move with respect to the magnetic field to different locations resulting in reduced accuracy of the linear motor system.

To compensate for the inconsistencies between various parts, the mover may be made using a multi-piece magnetic structure that is coupled to the magnet subassembly (e.g., via an adhesive). The magnetic structure may include a top plate that is physically centered on a detected center of a magnetic field. By centering the magnetic structure of the mover based on a detected center of the magnetic field, each mover may move to locations consistent with one another due to the applied magnetic field of the linear motor system.

Figure 1:
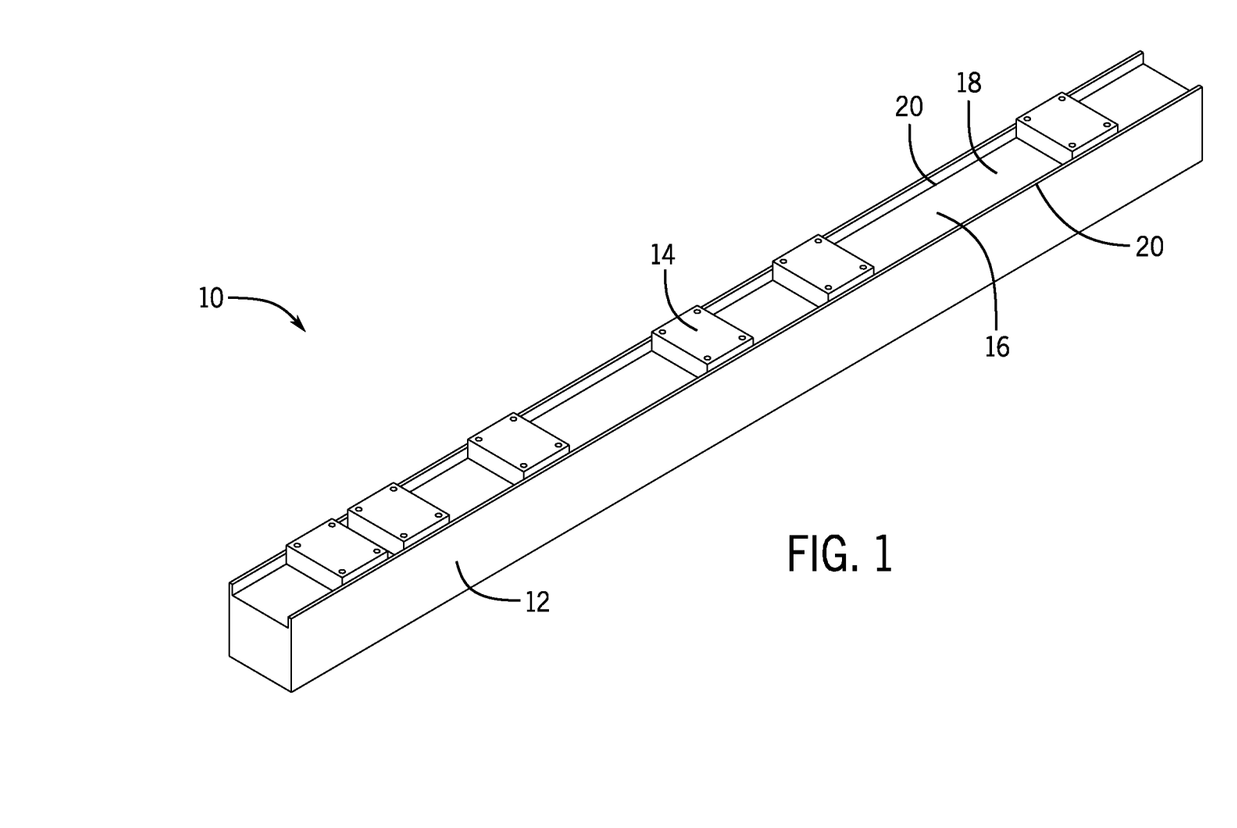
FIG. 1 is a perspective view of an embodiment of a linear motor system that includes a mover that moves along a path of the linear motor system.

Turning now to the drawings, FIG. 1 is a perspective view of a linear motor system 10 that includes a track 12 configured to support one or more movers 14 that move along a path guided by a guideway 16. While the illustrated linear motor system is straight, in other embodiments, the linear motor system may include curves, sharp horizontal and vertical turns, merge and diverge switching, vertical increases or decreases, and inverted operation, among others. The linear motor system may be used in any suitable application, such as moving bottles on an assembly line while they are being filled and capped, moving vials in a laboratory for analysis, moving electronic devices along a production line so that robots can insert components, and sorting objects that arrive from a multiplicity of sources and must be delivered to appropriate locations. As described in detail below, each of the movers 14 include ferromagnetic materials that interact with a magnetic field move the mover 14 to various locations.

Figure 2:
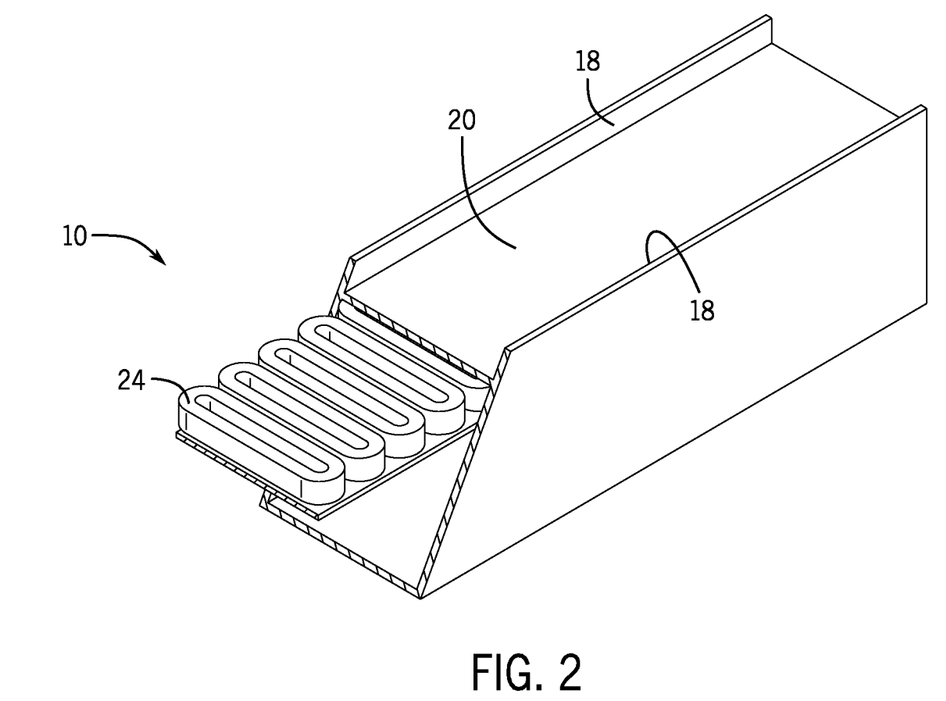
FIG. 2 is a cut away perspective view of an embodiment of the linear motor system of FIG. 1 moving along the path via coiled wire of the linear motor system.

The guideway 16 may guide the mover 14 along a path from location to location via the magnetic field. FIG. 2 is a perspective view of the linear motor system 10 in which the guideway 16 includes coiled wire positioned on or within a base 18 that defines a pathway 20 of the guideway 16. While FIG. 2 shows the coiled wire within the base, this is meant as an example and the magnetic field may be produced from coils or magnets within the sides of the pathway. The linear motor system 10 may include a control system and a power system. The control system may receive power from the power system. The power system may be electrically coupled to the coiled wire 24, and the control system may control current that flows, from the power system, through the coiled wire 24. By controlling the current that flows through the coiled wire 24, the control system may produce a magnetic field that moves the mover 14 to a desired location. That is, the magnetic field may apply a force to the ferromagnetic material of the mover 14 to move the mover 14 to the location. Depending on the magnetic field, the ferromagnetic material of the mover 14 may move the mover to a certain location at a certain speed and/or time.

Figure 3:
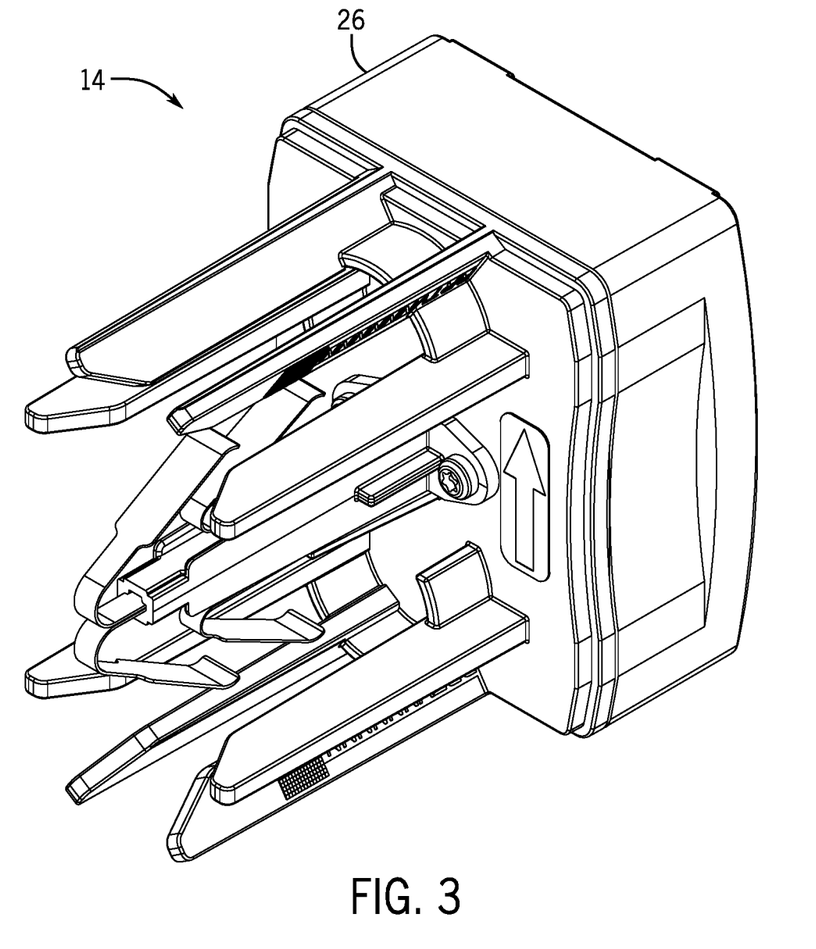
FIG. 3 is a perspective view of an embodiment of the mover of FIG. 1 having a body structure.
Figure 4:
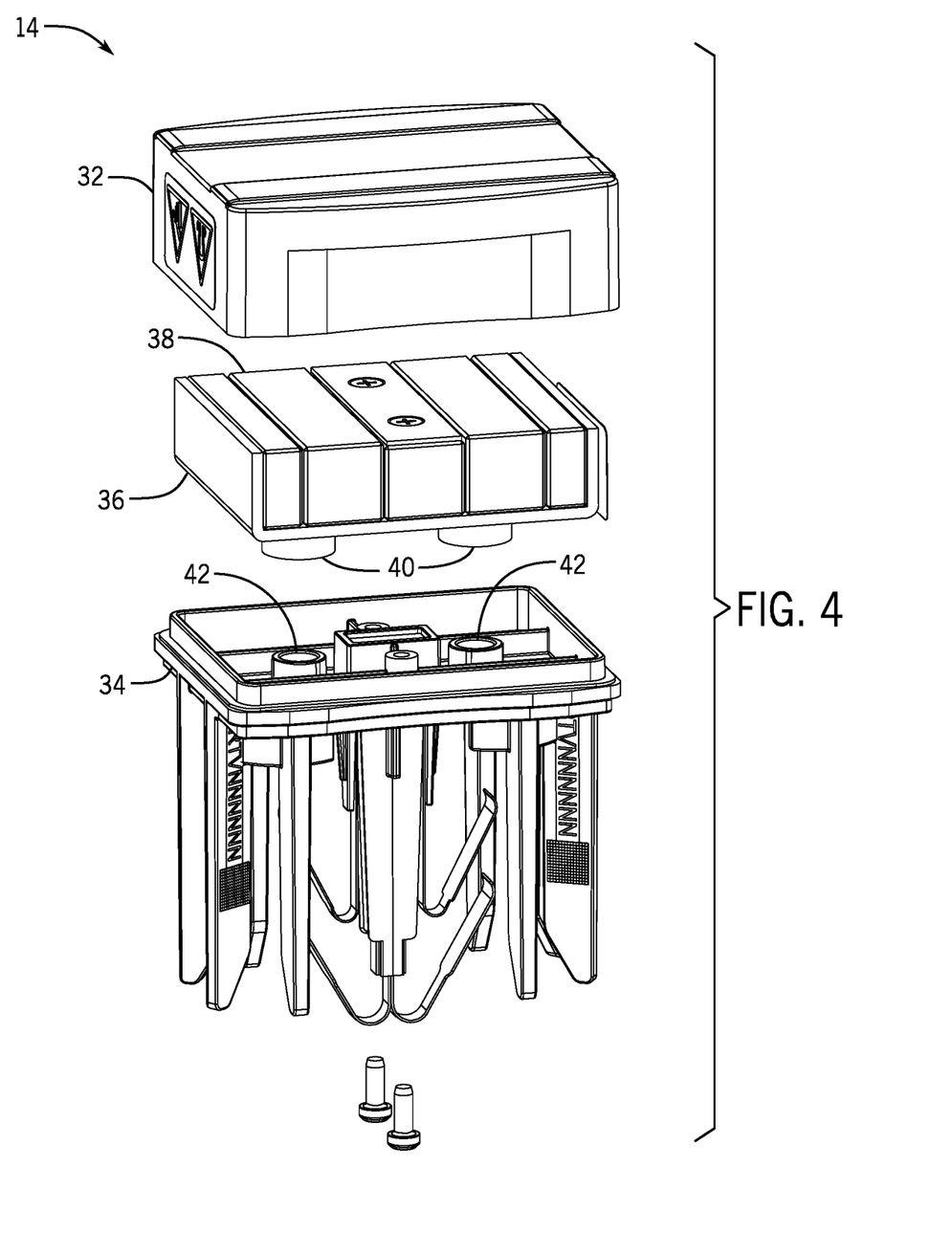
FIG. 4 is an exploded perspective view of an embodiment of the mover of FIG. 3 with the body structure exploded to show the magnetic structure and magnetic subassembly.

FIG. 3 is a perspective view of an assembly of a mover 14 of FIG. 1. The mover includes a body structure 26 that forms an enclosure. The body structure 26 of the mover 14 moves from the magnetic field applied to ferromagnetic materials within the body structure 26. FIG. 4 is an exploded view of the assembly of the mover 14. In the illustrated embodiment, the mover 14 includes an exploded body structure having a first part 32 and a second part 34 that form an enclosure over a magnetic structure 36 having a magnetic subassembly 38. The magnetic structure 36 may include one or more features 38 that align with one or more features 40 of the second part 34 of the body structure to secure the magnetic structure 36 with respect to the body structure. That is, the linear motor system 10 moves the magnetic structure 36 to a location that depends on the applied magnetic field from the coiled wire 24. Further, the location of the body structure on the linear motor system 10 may depend on the location of the magnetic structure 36 within the applied magnetic field as well as the location of the body structure with respect to the magnetic structure 36.

However, due to the inconsistencies of mechanical and magnetic tolerances in parts and subassemblies, the magnetic field produced by the linear motor system 10 may move each of the movers 14 to different locations. For example, each magnetic subassembly 38 may be differently sized due to inconsistencies in the manufacturing of the magnets of the magnetic subassembly 38. The different sizes may result in the magnetic subassembly 38 being positioned inconsistently with respect to the magnetic structure 36. Due to the positioning of the inconsistent positioning of the magnetic structure 36, the features that interact with the features of the body structure may be inconsistently positioned. As such, it is desirable to position the magnetic structure on the magnet subassembly in a manner that centers the magnetic structure on the magnetic field.

Figure 5:
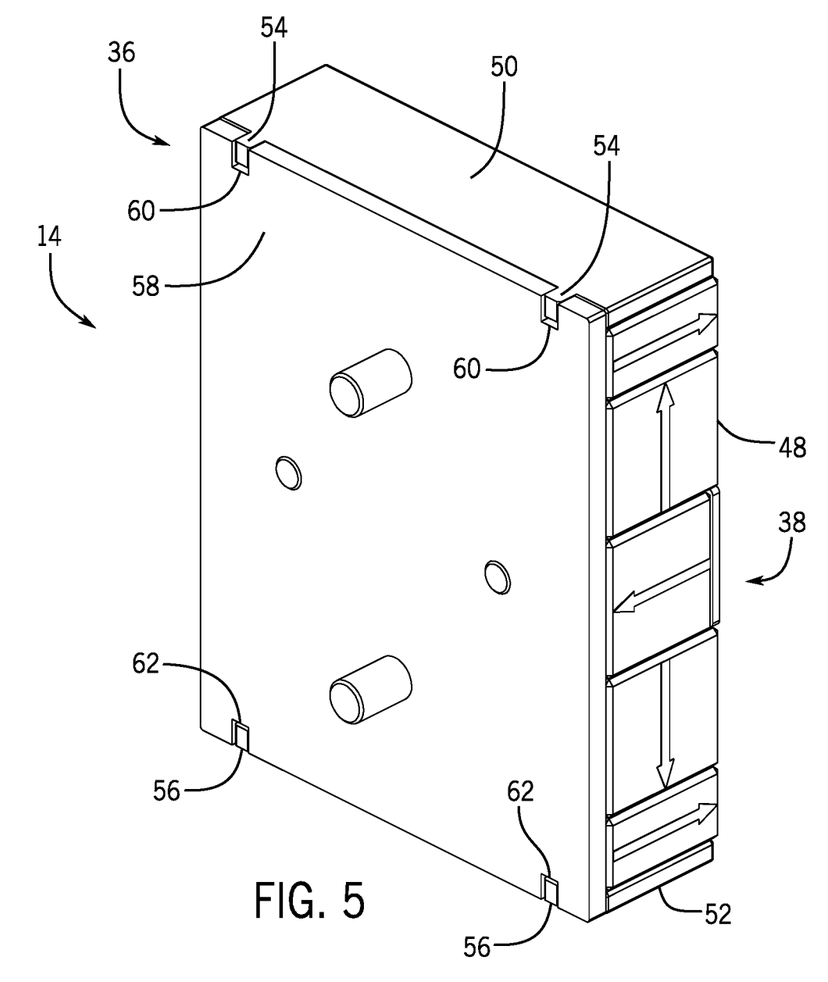
FIG. 5 is a perspective view of an embodiment of the magnetic structure and magnetic subassembly of FIG. 4.

FIG. 5 is a perspective view of an assembly of part of the mover 14, in accordance with an embodiment. The assembly includes the magnetic structure 36 and the magnetic subassembly 38. The magnetic subassembly 38 includes one or more magnets 48. While the illustrated embodiment includes five magnets, any suitable number of magnets may be included. In some embodiments, the magnetic subassembly 38 may form a halbach array in which the magnets augment the magnetic field in a first direction and cancel part of the field in another direction. Further, the magnets 48 may be coupled together (e.g., via an adhesive, such as an epoxy or glue) to form the magnet subassembly 38. While these are provided as examples of the magnets 48 within the magnetic subassembly 38, any suitable orientation and combination of magnets may be used.

In the illustrated embodiment, the magnetic structure 36 includes a multi-piece assembly disposed on at least one side of the magnet subassembly 38. The magnetic structure 36 includes a first side plate 50 disposed on a first lateral side of the magnetic subassembly 38 and a second side plate 52 disposed on a second lateral side of the magnetic subassembly 38, opposite the first lateral side. Each of the side plates 50 and 52 may be secured to the respective sides of the magnetic subassembly 38 (e.g., via an adhesive, such as an epoxy or glue). The first side plate 50 may include a first set of tabs 54, and the second side plate 52 includes a second set of tabs 56.

In the illustrated embodiment, the magnetic structure 36 includes a top plate 58. As discussed below, the top plate 58 is disposed in a position such that the mover 14 is centered based on the magnetic field. The top plate 58 includes a first set of lateral slots 60, and the first set of tabs 54 of the first side plate 50 engage with (e.g., enter into) the respective slots 60 of the top plate 58 when the plates 50, 52, and 58 are positioned around the magnet subassembly 38. The top plate 58 includes a second set of lateral slots 64, and the second set of tabs 56 engage with (e.g., enter into) the respective slots 60 of the top plate 58 when the plates 50, 52, and 58 are positioned around the magnet subassembly 38.

Figure 6:
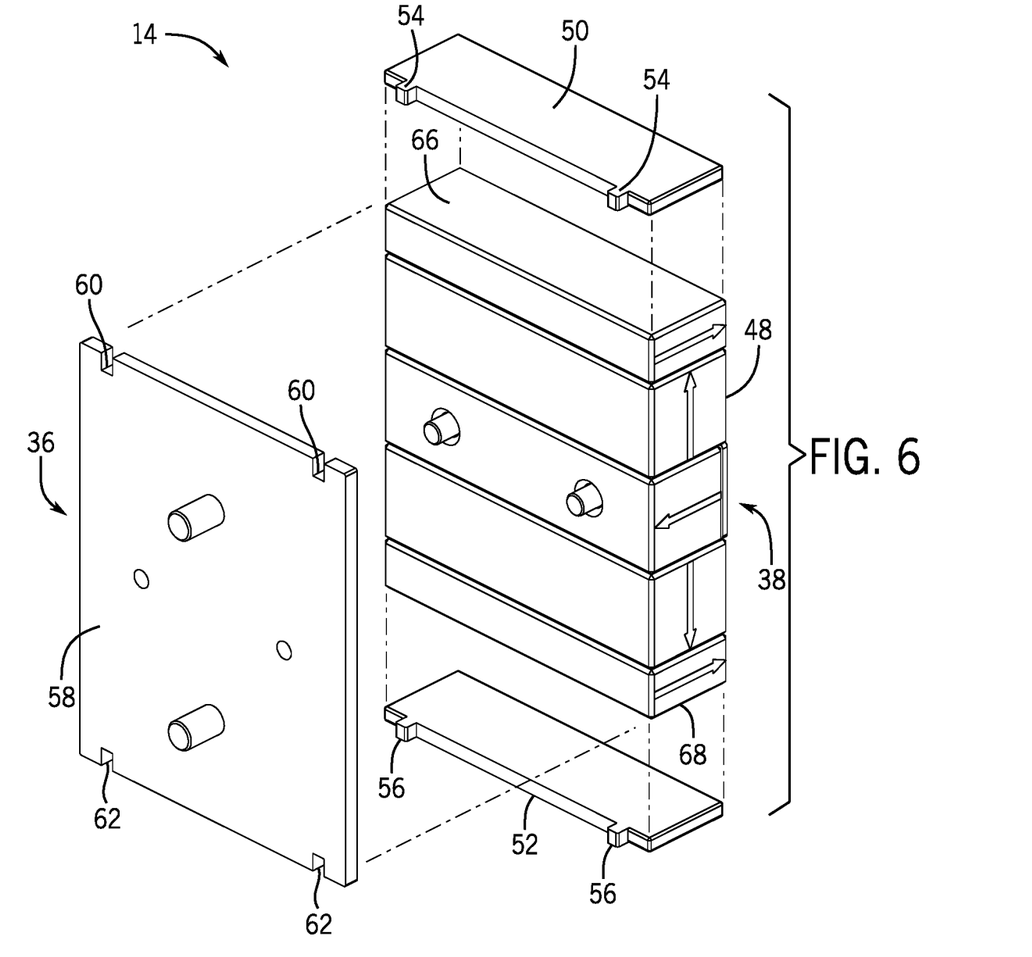
FIG. 6 is an exploded perspective view of an embodiment of the magnetic structure and the magnetic subassembly of FIG. 4.

FIG. 6 is an exploded view of the assembly of the part of the mover 14 of FIG. 5. To make the mover 14 for the linear motion system 10, the magnet subassembly 38 is assembled by securing the magnets with one another via an adhesive (e.g., epoxy or glue). The magnetic structure 36 is then disposed on the magnet subassembly 38 to create a resultant magnetic field with the magnet subassembly 38. For example, the first side plate 50 may be disposed on the first lateral side 66 of the magnetic subassembly 38. The first side plate 50 may be secured to the first lateral side 66 via an adhesive (e.g., epoxy or glue). Similarly, the second side plate 52 may be disposed on the second lateral side 68 of the magnetic subassembly 38. The second side plate 52 may be secured to the second lateral side 68 via an adhesive (e.g., epoxy or glue).

Figure 7:
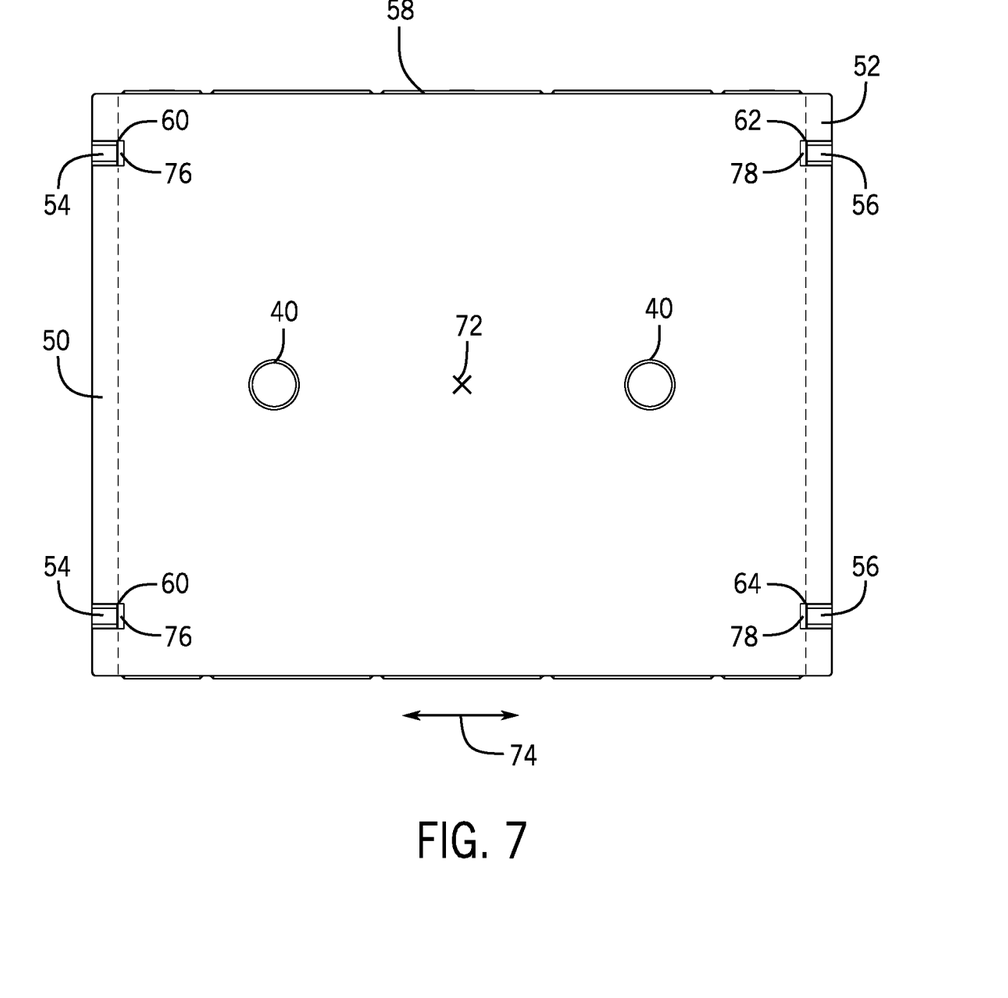
FIG. 7 is a top view of an embodiment of a top plate of the magnetic structure of FIG. 4.

FIG. 7 is a top view of the top plate 58 disposed on the magnetic subassembly 38. The top plate 58 is disposed on the magnetic subassembly 38 such that the magnetic structure 36 creates with the magnetic subassembly 38 a resultant magnetic field. The magnetic structure 36 is centered on a detected center of the resultant magnetic field. That is, a center 72 of the magnetic structure 36 may be positioned in a detected center of the resultant magnetic field. For example, a reference feature, such as protrusions 40 or a marking of the center 72, of the magnetic structure 36 may be aligned at a desired location with respect to a detected center of a magnetic field of the magnet subassembly or the resultant magnetic field.

By centering the magnetic structure 36 on the detected center of the resultant magnetic field, the first part 32 and the second part 34 of the body structure may be mounted on or with reference to the magnetic structure to position a physical center of the body structure at approximately the detected center of the resultant magnetic field. As such, centering the magnetic structure may enable the mover 14 to be located more accurately. For example, a physical center of the magnetic structure 36 may be located within +/−0.25 mm (e.g., 0-0.25 mm) of the detected center of the resultant magnetic field.

The slots 60 and 62 of the top plate 58 may form a gaps 76 and 78 between the respective tabs 54 and 56. The top plate 58 may be moved along the direction 74 by sliding the gaps 76 and 78 of top plate 58 between the tabs 54 and 56 to center the magnetic structure 36 in the detected center of the resultant magnetic field. Further, the top plate 58 may be secured to magnet subassembly via an adhesive (e.g., epoxy or glue) to ensure the top plate 58 remains centered in the resultant magnetic field. By having a multi-piece magnetic structure 36, each of the plates (e.g., first side plate 50, second side plate 52, and top plate 58) may contact the magnet subassembly 38 to eliminate clearances and potential offsets between the magnetic structure 36 and the magnet subassembly 38. The slots 60 and 62 of the top plate 58 and the tabs 54 and 56 provide lateral alignment between the side plates 50 and 52 and the top plate 58. For example, due to the positioning of the top plate 58, the multi-piece magnetic structure 36 may allow for pipetting from sample tubes as small 10 millimeters in diameter.

Figure 8:
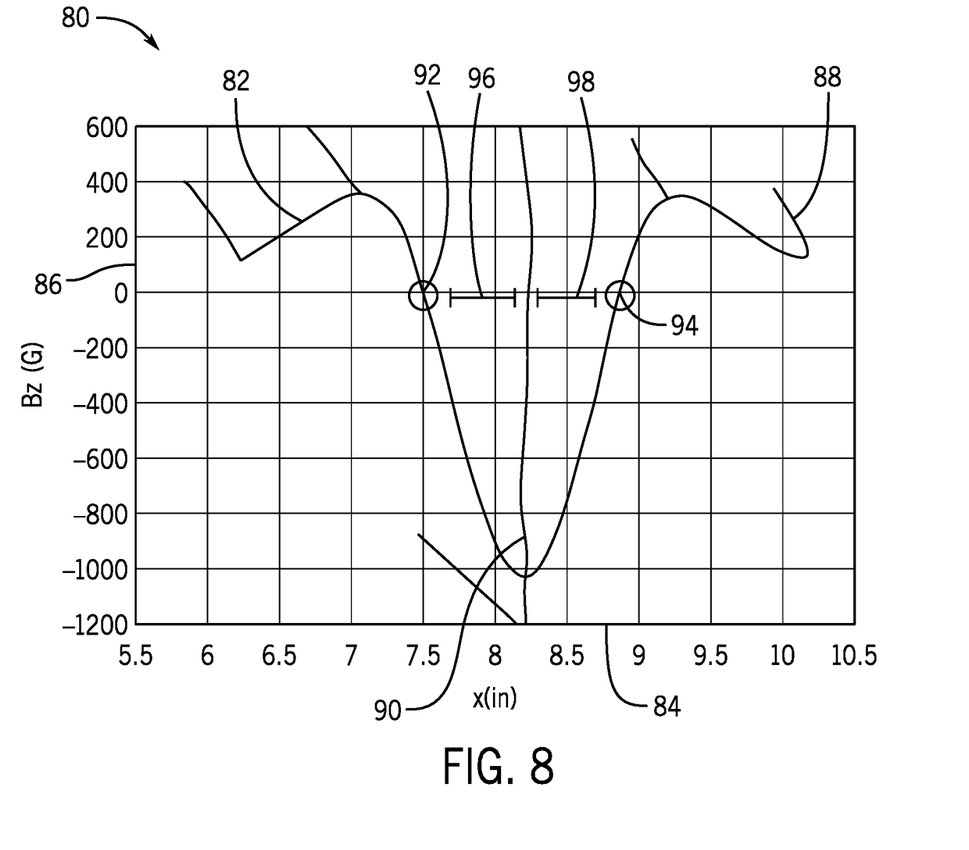
FIG. 8 is a graph of an embodiment of a mapping curve of the magnetic subassembly and magnetic structure of FIG. 4.

FIG. 8 is a graph 80 of a magnet array mapping curve 82 having field distances on the X-axis 84 and field strength on the Y-axis 86. While a two dimensional (2D) graph is shown, this is meant to be an example, and a three dimensional (3D) magnet array map may be used. In the illustrated embodiment, the graph 80 includes a centerline 90 indicating a center of the magnetic field produced by the magnet subassembly 38. To center the top plate 58 of the magnetic structure 36 on the magnet subassembly 38, a first reference point 92 and a second reference point 94 may be used to define the centerline 90. For example, the center of the magnetic structure 36 and the magnet subassembly 38 may be located between a first distance 96 from the first reference point 92 and a matching second distance 98 from the second reference point 94. The detected center may be determined by reference to locations where a magnetic field of the magnet subassembly 38 or the resultant magnetic field changes polarity. For example, the first reference point 92 and the second reference point 94 may be determined based on where the magnetic field changes polarity (e.g., zero crossing). Centering the magnetic structure 36 on the centerline 90 of the magnetic field reduces or eliminates machine, assembly, and magnetic tolerances. By reducing or eliminating the variance between the parts and subassemblies, the magnetic structure 36 and the magnet subassembly 38 may have improved positional accuracy.

Further, in three dimensional embodiments, the centerline 90 may be a center plane. That is, the magnet subassembly may include a magnetic field center plane and the detected center lies in the magnetic field center plane.

The magnetic structure 36 may be centered on the centerline 90 of the resultant magnetic field in which the magnetic field is a combination of the magnet subassembly 38 and the magnetic structure. For example, a magnetic field may be formed from the magnet subassembly 38. The magnetic field of the magnet subassembly 38 may be adjusted due to positioning of the magnetic structure 36 on the magnet subassembly 38 due to the ferromagnetic materials of the magnetic structure. By adjusting the magnet subassembly 38 to be centered on the resultant magnetic field, the body structure may be mounted on or with reference to the magnetic structure to position a physical center of the body structure at approximately the detected center of the resultant magnetic field. In some embodiments, the detected center of the magnetic field may be determined by mapping the magnet subassembly magnetic field prior to assembly of the magnet subassembly 38 and the magnetic structure 36. That is, the magnetic field may be determined based on the magnet subassembly magnetic field.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A mover for a linear motor system, comprising:
   a magnet subassembly;
   adjustably positioned magnetic structure disposed on at least one side of the magnet subassembly and creating with the magnet subassembly a resultant magnetic field, the position of the magnetic structure being adjusted to center the magnetic structure on a detected center of the resultant magnetic field; and
   a body structure mounted on and at least partially surrounding the magnetic structure to position a physical center of the body structure at approximately the detected center of the resultant magnetic field by adjustment of the body structure;
   wherein the magnetic structure comprises a plurality of plates adjustably positioned with respect to one another.

2. The mover of claim 1, wherein the plates comprise a top plate and two lateral plates.

3. The mover of claim 2, wherein the top plate comprises lateral slots, and the each of the lateral plates comprise a tab that enters into a respective slot of the top plate when the plates are positioned around the magnet subassembly.

4. The mover of claim 1, wherein the plates are adhesively secured to the magnet subassembly.

5. The mover of claim 1, wherein the detected center is determined by reference to locations where a magnetic field of the magnet subassembly or the resultant magnetic field changes polarity.

* * * * *